(12) United States Patent
Yokajty et al.

(10) Patent No.: US 6,257,395 B1
(45) Date of Patent: Jul. 10, 2001

(54) APPARATUS TO UNIFORMLY DISTRIBUTE BULK CONVEYED PARTS FOR INSPECTION BY A CAMERA

(75) Inventors: Joseph E. Yokajty, Webster; Thomas W. Palone, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/556,856

(22) Filed: Apr. 21, 2000

Related U.S. Application Data

(62) Division of application No. 09/026,078, filed on Feb. 19, 1998, now Pat. No. 6,116,409.

(51) Int. Cl.[7] .................................................. B65G 37/00
(52) U.S. Cl. ........................................... 198/580; 198/396
(58) Field of Search .................................. 198/580, 395, 198/396, 771, 750.1, 780.2, 539, 398, 399

(56) References Cited

U.S. PATENT DOCUMENTS

| | | | | |
|---|---|---|---|---|
| 3,224,553 | * | 12/1965 | Campbell | 198/580 |
| 3,338,385 | * | 8/1967 | Sage | 198/771 |
| 4,465,592 | * | 8/1984 | Nagl | 209/236 |
| 4,844,240 | * | 7/1989 | Hutter et al. | 198/391 |
| 5,069,329 | * | 12/1991 | Smith et al. | 198/752 |
| 5,120,190 | * | 6/1992 | Smith et al. | 198/391 |
| 5,301,791 | * | 4/1994 | Shampine | 198/391 |
| 5,314,055 | * | 5/1994 | Gordon | 198/395 |
| 5,385,227 | * | 1/1995 | Marsh | 198/773 |
| 6,116,409 | * | 9/2000 | Yokajty et al. | 198/771 |

* cited by examiner

Primary Examiner—Christopher P. Ellis
Assistant Examiner—Khoi H. Tran
(74) Attorney, Agent, or Firm—Mark G. Bocchetti

(57) ABSTRACT

An apparatus for uniformly distributing parts on a conveyor surface which includes a storage bin for holding randomly oriented parts in bulk, a conveyor adjacent the storage bin for acquiring a fragment of the randomly oriented parts in the storage bin and delivering that fragment of randomly oriented parts to a chute, a vibratory conveyor receiving the fragment of randomly oriented parts from said chute, and a belt conveyor for receiving the randomly oriented parts from said vibratory conveyor. The vibratory conveyor includes at least one rib projecting upward therefrom and extending across at least a section of the vibratory conveyor perpendicular to the direction of conveyance, the at least one rib acting as a flow obstruction to cause the randomly oriented parts traveling on the vibratory conveyor to gather and spread across a width of said vibratory conveyor to thereby spread more uniformly on the vibratory conveyor after passing over the at least one rib.

30 Claims, 5 Drawing Sheets

APPARATUS TO UNIFORMLY DISTRIBUTE BULK CONVEYED PARTS FOR INSPECTION BY A CAMERA

CROSS-REFERENCE TO RELATED APPLICATIONS

The present application is a divisional of U.S. application Ser. No. 09/026,078, filed Feb. 19, 1998 now U.S. Pat. No. 6,116,409.

FIELD OF THE INVENTION

The present invention relates generally to automated manufacturing systems and, more particularly, to flexible parts feeding systems for automated inspection and/or manufacturing.

BACKGROUND OF THE INVENTION

Parts feeders used in the manufacturing industry are well known. Typically, such parts feeders comprise various types of hoppers, vibratory-type bowls or centrifugal-type bowls containing a bulk source of parts. These devices are used to separate and orient parts and properly present them to a subsequent process or assembly device. Such devices are typically capable of feeding one part type or a very small family of part types.

The use of a vision-based flexible parts feeders is a relatively new phenomenon in the manufacturing industry which is gaining credibility. With the use of such vision-based parts feeders, companies are able to make their manufacturing systems more flexible by designing feeders with the capability to feed a very wide variety of parts. Doing so allows for a more cost effective means to automate the production of smaller volume products. Typically, in operation, such parts feeders deliver bulk parts from a source to a transport surface for inspection and subsequent picking therefrom by a robot. Preferably, a single camera is used to inspect the separated parts on the transport surface. The inspection is primarily used to identify which parts may be successfully grasped by a robot as well as the location of each identified "pickable" part. Flexible parts feeders also typically include a system for recirculating parts which cannot be grasped by the robot.

The performance and maximum feed rate of a flexible parts feeder is closely related to the feed rate, distribution, separation, stability and orientation of parts passing into the camera field of view as well as the performance of the vision system used therewith. Controlling these part attributes results in the ability to maximize the number of parts that can be inspected and successfully grasped by a robot in a given amount of time. The part feed rate into the camera field of view is preferably very consistent and controlled by the device which introduces parts from the bulk source. The distribution and separation of parts being inspected is preferably controlled by the conveyance portion of the feeder preceding the camera field of view. In addition, this conveyance portion also typically dictates the distribution, separation and, to some extent, the orientation (or number of stable states) of parts passing into the field of view which all affect the number of pickable parts during a given amount of time. The stability of parts as they pass into the camera field of view is also determined by the same conveyance portion and the means by which parts are transferred from the conveyance portion to the said transfer surface. It should be understood that if parts are bouncing around or not resting in the most stable orientations, additional part settle time is needed before inspection may occur which reduces feeder throughput.

One flexible parts feeder known in the prior art includes a series of tiered belts and an elevating bucket device for circulation of parts within the feeder. This parts handling technique results in a flow of parts through the feeder which is inconsistent due to a non-uniform part feed rate into the camera's field of view. In addition, parts are dropped from one belt to another in a way that results in a less than desirable part separation and additional undesirable part resting states. The belt which serves as the inspection surface is typically indexed back and forth to better spread out parts or is rapidly indexed to present more parts to the inspection camera. As a result additional parts settling time is required prior to inspection which limits performance and overall feeder throughput.

Another type of flexible parts feeder which is known in the prior art incorporates two pile-covered vibratory conveyor devices. In this type of parts feeder, a quantity of bulk parts is circulated on two opposing and side-by-side vibratory conveyors to move bulk parts in a generally circulating pattern. The conveyor vibrations and pile material are used to both convey and distribute parts into the field of view of a downward-looking camera which is located directly over one portion of one of the conveyor surfaces. The robot grasps parts directly off of the vibratory conveyor surface. This requires that the part must settle out prior to part inspection and grasping thereby decreasing feeder performance. Further, due to the nature of the bristle geometry of the pile material used for the vibratory conveyor, very small parts or parts with sharp protrusions tend to lodge in the pile material. As a result of the method employed to recirculate parts, control of part feed rate and part distribution through the feeder, and parts "sticking" in the pile material, feeder through put is limited (average feed rates in the range of 15 to 40 parts per minute).

Still another flexible parts feeder available on the market today includes a vibratory hopper for introducing parts from a bulk source, a relatively violent shake platen, a set of adjustable "fences" or gates for partially orienting parts and urging parts into a substantially single file prior to inspection and a belt which is indexed with rapid acceleration and deceleration to transport parts from the platen to the camera inspection area. Primarily due to the process of forming of the single file and the rapid indexing of the belt the rate of "pickable" parts presented to the camera field of view is limited to around 20 to 30 parts per minute.

SUMMARY OF THE INVENTION

It is, therefore, an object of the present invention to provide a parts feeder to an inspection and/or robotic-assisted operation which can achieve higher feed rates of separated parts for inspection or acquisition.

It is a further object of the present invention to provide a vibratory conveyor for use with a parts feeder which effectively spreads out bulk parts onto a surface for inspection in a way that increases the uniform distribution of separated parts on the surface and reduces the amount of time required for the parts to achieve a stable state after the parts are fed onto the final inspection belt surface.

Yet another object of the present invention is to provide a vibratory conveyor which efficiently spreads out bulk parts in a relatively short conveyor length.

Still another object of the present invention is to provide a vibratory conveyor which presents separated parts at a high feed rate without increasing inspection belt velocity.

Another object of the present invention is to provide a vibratory conveyor apparatus that includes a series of ribs protruding upward from the conveyor surface which serve to more quickly spread out and separate bulk parts in both a width-wise and length-wise direction as they pass over the conveyor surface thereby reducing required conveyor length.

Briefly stated, the foregoing and numerous other features, objects and advantages of the present invention will become readily apparent upon a review of the detailed description, claims and drawings set forth herein. These features, objects and advantages are accomplished through the combination of a belt conveyor preferably driven at a constant speed, and a vibratory conveyor which preferably includes flow obstructions which serve to increase the uniform distribution of separated parts and thus, the density of separated parts per unit area of the belt conveyor. It should be understood that effective inspection and/or acquisition of parts can only occur with separated (non-overlapping) parts. The vibratory and belt conveyors are preferably used in conjunction with a bulk elevator and a reciprocating-plate type hopper. The bulk elevator is used to separate a quantity of parts from a storage bin and deliver that quantity to a staging platform. The reciprocating-plate type conveyor separates smaller portions of the parts from the staging platform and delivers them to the vibratory conveyor. The vibratory conveyor, which has a relatively vertical shake angle, includes one or more obstructions protruding up from the surface thereof. Such obstructions are generally transverse to the direction of movement of the parts on the vibratory conveyor. The vibratory conveyor aids in separation of parts from one another and causes individual parts to seek the parts' most stable resting orientations. The obstructions serve to temporarily "dam up" the flow of parts which tends to very quickly spread out parts across the width of the conveyor. It has also been shown through experimentation that these obstructions tend to provide a much greater resistance to larger "clumps" of parts than those parts which are partially separated from one another. As a result, the obstructions effectively break up and spread out "clumps" of parts along the length of the vibratory conveyor. Due to both effects, parts exit the vibratory conveyor with a much greater density of singulated (separated inspectable and/or pickable) parts which serves to increase the feed rate of singulated parts presented to the inspection area and/or the picking area for picking by the robot. In other words, although the obstructions decrease the overall distribution density of parts on the vibratory conveyer (because clumps of parts and overlapping parts are substantially eliminated), the overall distribution density of separated and therefore, inspectable and/or pickable parts is increased. This increase in distribution density of separated parts results in the desired higher feed rate, and this higher feed rate of separated parts is accomplished without increasing the speed at which parts are conveyed. The vibratory conveyor drives the parts to be delivered to the belt conveyor which is preferably driven at a constant speed.

DETAILED DESCRIPTION OF THE INVENTION

Figure 1:
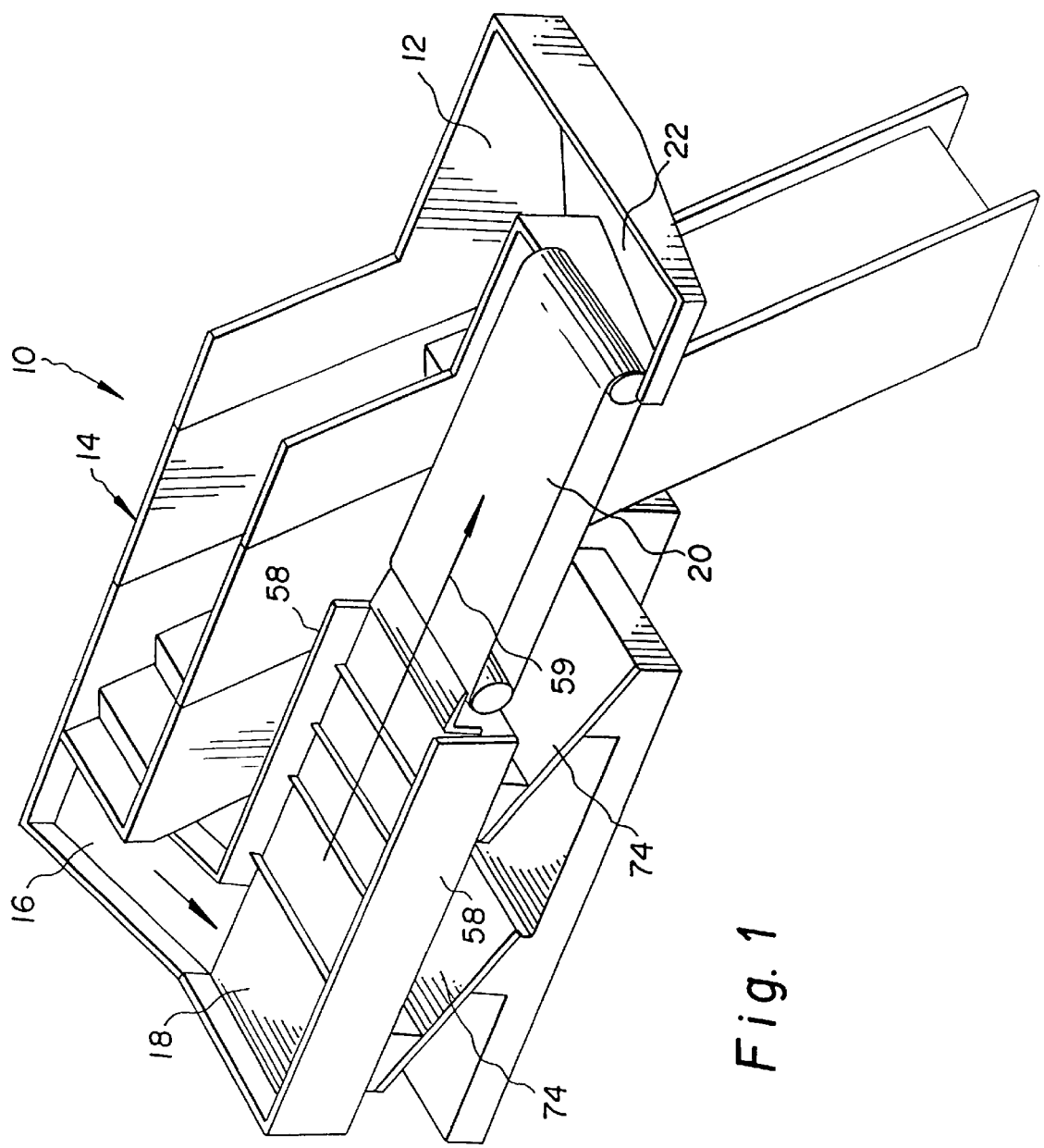
FIG. 1 is a perspective view of the parts feeder of the present invention with the electromagnetic actuator and associated support structure removed therefrom for simplicity.

Turning first to FIG. 1, there is shown a perspective view of the flexible parts feeder 10 of the present invention. The flexible parts feeder 10 includes a storage bin 12 which serves to hold the reservoir of parts. Parts are removed from storage bin 12 with a reciprocating plate parts elevator section 14 which will be described more fully hereinafter. The reciprocating plate parts elevator section 14 delivers parts to chute 16. Chute 16 is mounted to vibratory conveyor 18 and is inclined such that parts delivered thereto slide down chute 16 and onto vibratory conveyor 18. Parts conveyed along the length of vibratory conveyor 18 are delivered to belt conveyor 20 which is a typical endless loop belt conveyor system. As will be discussed in more detail hereinafter, a portion of belt conveyor 20 is in the field of view of an image capturing means (not shown) which may be used for inspection and/or identification of parts. Also not shown is a robot which "picks" the desired parts from belt conveyor 20. Parts not picked from belt conveyor 20 fall therefrom into trough 22. Such parts slide down trough 22 into storage bin 12. In such manner, parts not picked by the robot are recirculated through apparatus 10 such that they will once again pass through the camera's field of view on belt conveyor 20.

Figure 2:
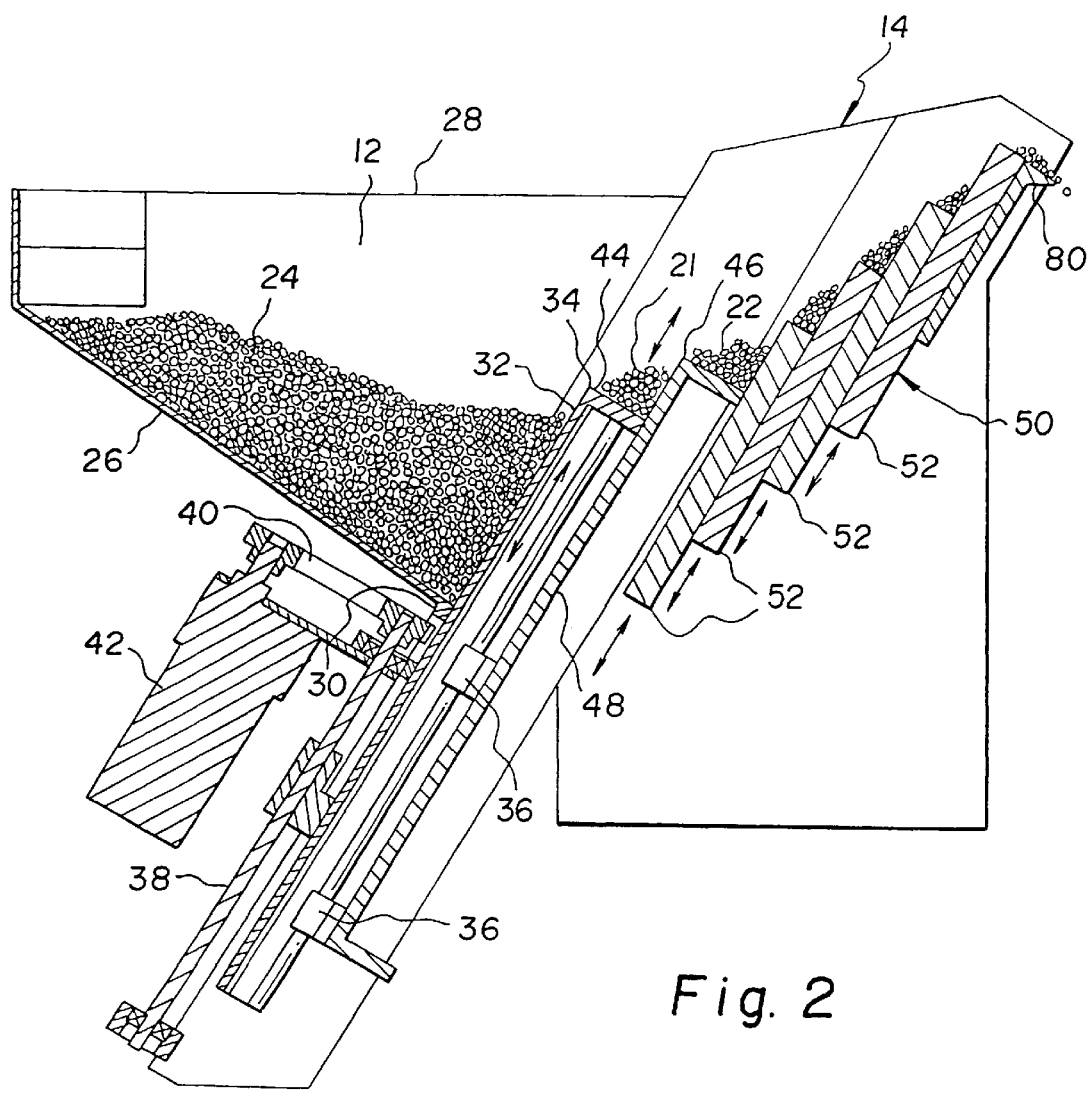
FIG. 2 is a schematic cross-sectional schematic view of the storage bin and reciprocating plate parts elevator section of the apparatus depicted in FIG. 1.

Looking next at FIG. 2, there is schematically depicted a cross-sectional view of the storage bin 12 and reciprocating plate parts elevator section 14. As can be seen, a plurality of randomly oriented parts 24 reside in storage bin 12 which are introduced thereto through the open top of storage bin 12. The randomly oriented parts 24 may all be identical parts, or may be two or more different types of parts. The bottom wall 26 of storage bin 12 is inclined toward elevator section 14. The sidewalls 28 of storage bin 12 may also be inclined toward the base 30 of bottom wall 26. In such manner, the parts 24 are funneled toward the base 30 to press against the front face 32 of bulk elevator 34. Bulk elevator 34 is preferably supported by linear bearings 36 and is preferably actuated by a reversing lead screw 38, a belt 40 and a motor 42. Bulk elevator 34 is driven in a reciprocating motion by motor 42 such that on downward movement, a plurality of parts 24 fall by gravity onto the top surface 44 of bulk elevator 34. On its upward stroke, bulk elevator 34 rises to a level such that the top surface 44 is substantially even with the top surface 46 of stationary platform 48. Thus, when bulk elevator 34 reaches the peak of its upward stroke, the parts 24 supported thereon fall by gravity onto the top surface 46 of staging platform 48. Residing adjacent to staging platform 48 is a reciprocating plate conveyor 50. Reciprocating plate conveyor 50 is preferably that conveying apparatus taught in U.S. Pat. No. 5,385,227. Such conveying apparatus is manufactured by Omnifeed Systems, Inc., of Emmanaus, Pa. Reciprocating plate conveyor 50 includes a series of opposingly reciprocated plates 52 which are actuated in a synchronized way (by means not shown)

such that parts 24 are taken from top surface 46 of staging platform 48 and raised and transferred to each successive reciprocating plate 52 to ultimately deliver parts 24 into chute 16. The rate at which bulk elevator 34 reciprocates should be adjusted so that there is always some minimum quantity of parts 24 residing on top surface 46. It should, of course, reciprocate at a rate which is substantially less than the rate at which reciprocating plates 52 reciprocate. A portion of those parts 24 residing on top surface 46 then slide onto the lowest reciprocating plate 52 when that lowest reciprocating plate 52 reaches the bottom of its downstroke during reciprocation. Through a series of transfers between subsequent reciprocating plates 52, parts 24 are elevated to the discharge area to fall into chute 16. The quantity of parts which can be held on top surface 46 of staging platform 48 should be greater than the quantity of parts 24 which can be held on top of any of reciprocating plates 52. It is believed that the ratio of the surface area of top surface 46 to the surface area of the top of a reciprocating plate 52 should be in the range of from about 2:1 to about 3:1. The use of bulk elevator 34 in combination with staging platform 48 aid in ensuring that a small and consistent quantity of parts 24 is fed through elevator section 14 to chute 16. Further, the use of bulk elevator 34 results in a decrease in the churning of parts in the lower portion of storage bin 12 when storage bin 12 is relatively full. Merely extending reciprocating plate conveyor 50 down into the full depth of storage bin 12 would have the disadvantage of having one or more reciprocating plates 52 which at the top of their respective strokes would still be below the level of parts 24 in storage bin 12. The resulting churning of parts 24 can potentially damage some parts 24. It should be understood that the series of transfers from storage bin 12 to bulk elevator 34 to staging platform 48 and to each successive reciprocating plate 52 tends to detangle the randomly oriented parts 24 from one another in a very gentle way. The rate at which reciprocating plates 52 reciprocate should be adjusted so that some average desired part feed rate is obtained.

Other elevating-type conveyors may be substituted for reciprocating plate conveyor 50 and/or bulk elevator 34. One example of such an elevating-type conveyor which could be used to acquire parts 24 from storage bin 12 and deliver such parts 24 to chute 16 is a cleted conveyor belt.

Figure 3:
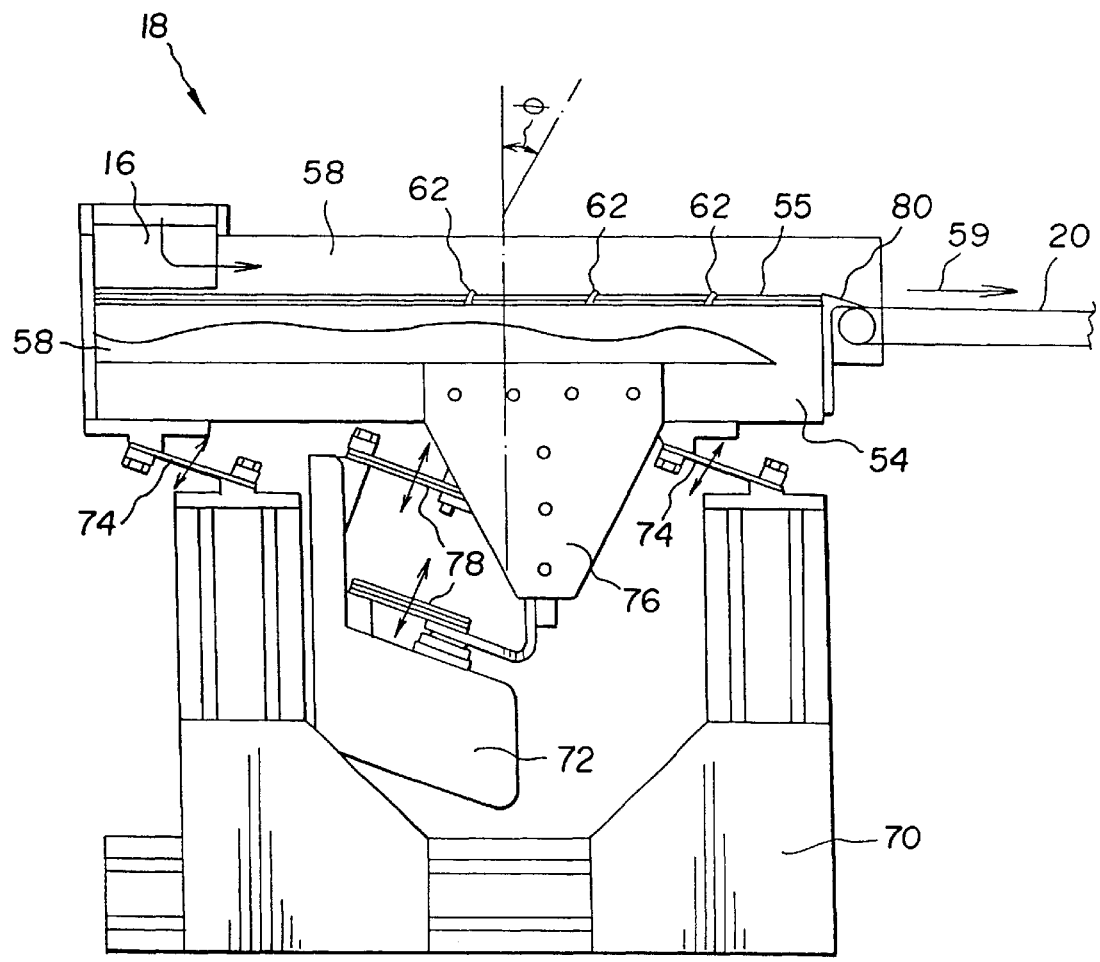
FIG. 3 is a side elevational view of the vibratory conveyor section of the apparatus depicted in FIG. 1 with a sidewall partially removed therefrom.

Turning next to FIG. 3, there is shown the side elevational schematic of the vibratory conveyor section 18 of the present invention. Vibratory conveyor section 18 includes a support member or upper frame 54 with a generally planar top surface. The term "generally planar" top surface as used herein is intended to mean a surface comprised of a single surface or multiple surfaces, all of which reside in one plane. In other words, the top surface of support member 54 may be either continuous or discontinuous. An example of a support member 54 with a discontinuous top surface would be an extruded aluminum structural member with a series of spaced apart, parallel T-shaped sections forming the top surface. A second example of a support member 54 with a discontinuous top surface would be a support member 54 comprised of a plurality of spaced apart, parallel I-bars with the top surfaces of the individual I-bars residing in the same plane. The top surface of support member 54 is covered or partially covered with a vibratory surface material which is preferably a pile material 55 which includes a base 56 with fibers 57 projecting therefrom (see FIG. 4). Bordering each side of support member 54 is a side wall 58 which serves to contain parts 24 therebetween. Pile material 55 is preferably Brushlon® as manufactured by 3M Company of St. Paul, Minn. Brushlon® has fibers which are oriented about 15° to 20° from vertical. The individual fibers 57 of pile material 55 are reoriented in the range of from about 50° to about 80° from vertical by compressing the material while heating. As a result, parts 24 are supported on the sides of the individual fibers or bristles 57 and not on the ends of the bristles 57 as is typical of vibratory conveyors of the prior art. The individual fibers or bristles 57 are all inclined toward the downstream direction and the continuous belt conveyor 20 as indicated by arrow 59. The pile material 55 preferably includes a backer member 60 made of a ferromagnetic sheet metal which is adhered to the underside of pile material 55. There is a magnetic vinyl sheet 61 which is affixed to support member 54. In such manner, the pile material 55 through backer member 60 can be magnetically coupled to support member 54. This method of coupling the pile material 55 to support member 54 provides an easy means to remove and/or replace pile material 55. Further, the magnetic coupling allows for more intimate planar contact between the two members as opposed to the Velcro®-type arrangement typically used to fasten pile material to the surfaces of a vibratory conveyor. It should be understood that the positions of backer member 60 and magnetic vinyl sheet 61 can be reversed. In other words, a backer member 60 made of a ferromagnetic sheet metal can be adhered to the support member 54 and the magnetic vinyl sheet 61 can be affixed to the underside of pile material 55. Further, a second magnetic vinyl sheet could be substituted for backer member 60. The magnetic coupling arrangement of the present invention results in a more efficient transfer of energy during vibration over Velcro®-type interfaces which generally act to dampen vibration. Further, the magnetic coupling arrangement of the present invention allows for much easier positioning of pile material 55 than is afforded by Velcro®-type interfaces. Those skilled in the art of vibratory conveyors will recognize that a smooth surfaced material such as steel, plastic or rubber may be substituted for pile material 55. Using a smooth surfaced material will likely require an adjustment of vibration amplitude depending on the specific parts 24 being conveyed.

Projecting upward from support member 54 is at least one rib 62 and preferably, a series of ribs 62. Each rib 62 preferably traverses the width of pile material 55 and is preferably generally perpendicular to each of sidewalls 58. However, it should be understood that each rib 62 could be formed in two or more sections with a gap between adjacent sections and between the end sections and sidewalls 58. Thus, a single rib 62 may be formed, for example, by an array of closely spaced, projecting nubs arranged in one or more lines across the width of pile material 55 wherein the nubs in adjacent lines may be staggered from one another. Any gaps left in ribs 62 should preferably be small enough such that individual parts 24 could not pass directly therethrough without having to pass over at least a portion of rib 62. Each of ribs 62 may project to the same height above pile material 55. However, it is preferred that ribs 62 are arranged in a such way that the height of each successive rib 62 moving toward the downstream is slightly less than the height of the preceding rib 62. With the ribs 62 decreasing in height, less effort is required to get individual parts over each successive rib 62. Each rib 62 aids in spreading the individual parts across the width pile material 55. Thus, each rib 62 aids in obtaining a more optimum distribution density of parts for picking by a robot while being less of an obstacle to the forward movement of parts on vibratory conveyor section 18. The term "generally perpendicular" as used herein with reference to ribs 62 is intended to include ribs 62 which are perpendicular to each of sidewalls 58 and ribs 62 which are within about 5° of being perpendicular to each of sidewalls 58, as well as ribs 62 formed by arrays of nubs wherein the array of nubs is perpendicular to each of sidewalls 58, or the array of nubs is within about 5° of being perpendicular to each of sidewalls 58.

Figure 4:
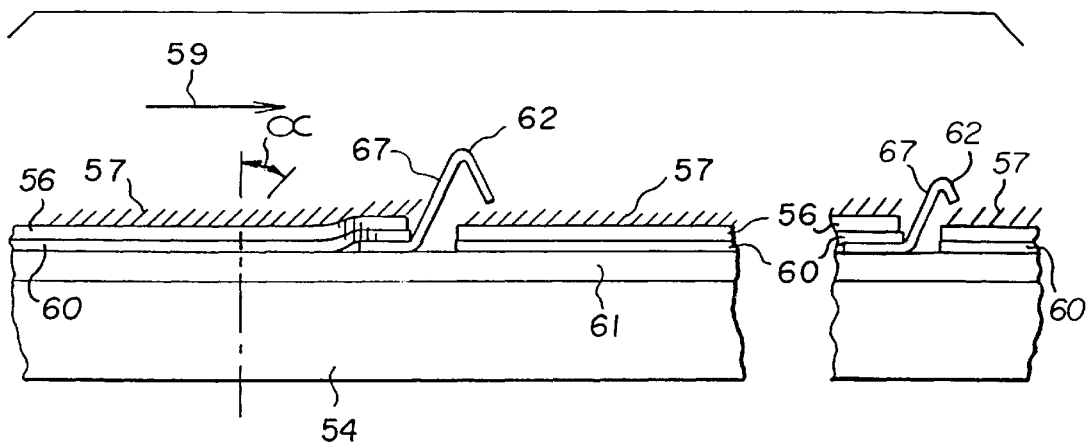
FIG. 4 is a side elevational view of a portion of the vibratory conveyor surface with an exemplary rib projecting therethrough.
Figure 5:
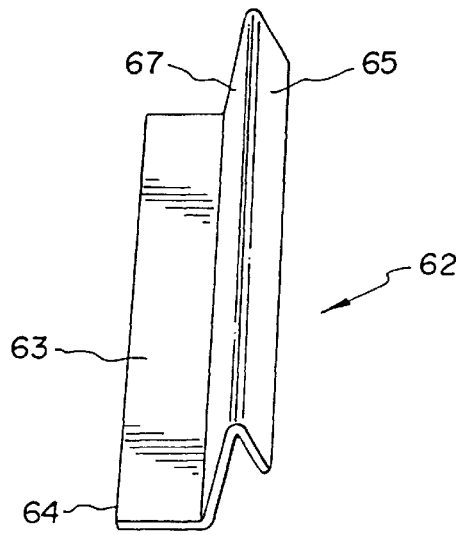
FIG. 5 is a perspective view of the exemplary rib shown in FIG. 4.

One possible design for ribs 62 is depicted in FIGS. 4 and 5. In such exemplary design, rib 62 is constructed from a formed sheet metal strip 64 to create a base portion 63 and an inverted V-shaped portion 65. Rib 62 is retained in place by trapping base portion 63 between backer member 60 and magnetic vinyl sheet 61. Thus, if sheet metal strip 64 is made from a ferromagnetic material, then rib 62 is both mechanically and magnetically coupled between backer member 60 and magnetic vinyl sheet 61. The front face 67 of rib 62 may be vertical but preferably resides at an angle of from about 10° to about 30° from vertical toward the direction of flow of parts 24. Depending on the shape and size of parts 24 being conveyed, a vertical front face 67 may result in trapping some parts 24. The actual height of ribs 62 should be determined empirically for the specific parts 24 being conveyed.

Returning to FIG. 3, support member 54 is connected to lower frame 70 by means of flexures 74. Extending from support member 54 is bracket 76. Electromagnetic actuator 72 is connected to bracket 76 via flexures 78 and is thus suspended from support member 54. Flexures 74 and flexures 78 are preferably oriented such that they reside at an angle in the range of from about 10° to about 30° from the horizontal. This results in an angle of vibration θ of support member 54 in the range of from about 10° to about 30° from vertical. Flexures 74 and flexures 78 which are generally equivalent to leaf springs are preferably made from Scotchply® (which is a non-woven, fiberglass reinforced, epoxy resin material) as manufactured by 3M of St. Paul, Minn. Other materials such as steel may be used. Through electromagnetic actuator 72, support member 54 and pile material 55 affixed thereon is vibrated in a more vertical direction than typical vibratory conveyors of the prior art. One suitable electromagnetic actuator 72 for use with the present invention is the F-T01A electromagnetic actuator as manufactured by the FMC Material Handling Equipment Division, Homer City, Pa. It is available as a unit complete with flexures 78. Those skilled in the art will recognize that electromagnetic actuator 72 will include means for adjusting the amplitude of vibration imparted to vibratory conveyor 18. Through the proper adjustment of vibration amplitude most unstable part orientations can be eliminated.

In operation, a quantity of parts 24 slides down inclined chute 16 through both gravity and the vibrations imparted thereto by electromagnetic actuator 72. The vibrations transmitted through pile material 55 cause parts 24 received via chute 16 to begin to spread out on pile material 55 and move toward the first rib 62. The more vertical direction of the vibration tends to spread out the parts 24 more effectively without increasing the speed of the parts 24 as they are conveyed over the pile material 55. Further, it should be appreciated that the relatively flat angle at which the individual fibers are oriented on pile material 56 substantially eliminates the risk of parts becoming stuck or lodged in the pile material 56 as can sometimes occur when conveying parts 24 possessing sharp features over a pile material with fibers which are more vertically oriented.

Figure 6:
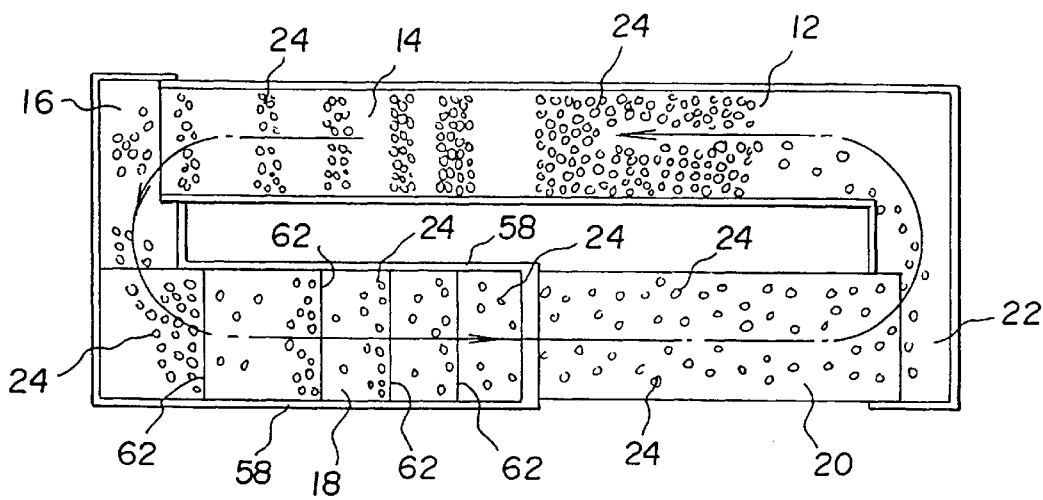
FIG. 6 is a top plan view schematic of the apparatus depicted in FIG. 1 illustrating parts distribution density in the conveyance loop formed by the apparatus of FIG. 1.

Each rib 62 creates a partial flow obstruction of parts 24 moving along pile material 55 toward belt conveyor 20. This flow obstruction results in an accumulation of parts 24 just upstream of each rib 62 which causes parts 24 to further spread widthwise across pile material 55. It should also be noted that the flow obstructions created by rib 62 provide a means to control the flow of parts 24 through vibratory conveyor 18 regardless of part size. Preferably, the height of each rib 62 and the vibration amplitude imparted to planar member 54 are chosen in a way that will cause the greatest flow obstruction at the first rib 62, a lesser flow obstruction at the second rib 62, and so on such that, with each successive rib, the flow obstruction lessens. Thus, if the vibration amplitude is consistent across planar member 54, the height of the first rib 62 would be the greatest with each subsequent rib 62 decreasing in height. It should be understood that the more vertically oriented vibration direction maximizes the effectiveness of ribs 62. The spacing between adjacent ribs 62 should be chosen based on the expected average accumulation of parts 24 at each rib 62. This can, of course, be determined empirically. The parts 24 will separate from one another thereby minimizing the amount of parts 24 overlapping one another. Overlapping parts 24 are not "pickable" and will therefore be recirculated. By helping to spread out parts 24 across the width of vibratory conveyor 18, ribs 62 create a more uniform distribution of separated parts 24. This results in an increase in the rate of flow of "pickable" parts 24. This is illustrated in FIG. 6 which is a top plan view schematic showing part distribution density through the conveyance loop of apparatus 10. Note that there is shown parts 24 gathering at each successive rib 62. This gathering is what causes spreading of parts 24 across the width of vibratory conveyor 18. With each successive rib 62 getting shorter, the "gathering" of parts 24 decreases ultimately leading to the desired more uniform density of parts 24 on the last section of vibratory conveyor 18 just before transfer to the belt conveyor 20. It will be appreciated that for a given series of ribs 62, the vibration amplitude of the planar member 54 may be adjusted to better achieve the desired average accumulation of parts 24 at each rib 62. A larger vibration amplitude results in a overall decrease in average accumulation of parts at each rib 62 and a smaller vibration amplitude results in an overall increase in average accumulation of parts in at each rib 62.

At the exit of the vibratory conveyor 18, parts 24 are moved across a transition plate 80 and onto belt conveyor 20 due to the vibrations caused by electromagnetic actuator 72. Transition plate 80 preferably has a minimal elevation change such that its length in the direction of flow is as short as possible and its angle of incline from transition plate 80 down to belt conveyor 20 is not more than about 5°. The short length and minimal elevation change of transition plate 80 allows parts 24 to be transferred without significantly affecting individual part orientation and separation. The velocity of bell conveyor 20 should be greater than or equal to the average speed of parts 24 traveling on vibratory conveyor 18. Belt conveyor 20 is preferably traveling at a relatively slow velocity such as about one inch per second (1"/sec) for the purpose of inspection and picking. The speed of belt conveyor 20 may, of course be increased to thereby further increase flow rate of parts 24. However, operating belt conveyor 20 at higher speeds will likely require a more expensive strobe lighting system for viewing parts 24 with the image capture means (not shown). Preferably, conveyor belt 20 is driven at a constant speed by a motor (not shown) and not in an indexing motion. If any starting and stopping of conveyor belt 20 is required, it should be done in such a manner that does not create any undesirable instability of parts 24 resting on belt conveyor 20. Those skilled in the art will recognize that belt conveyor 20 will also have associated therewith an encoder (not shown) which allows monitoring of incremental belt movement.

Figure 7:
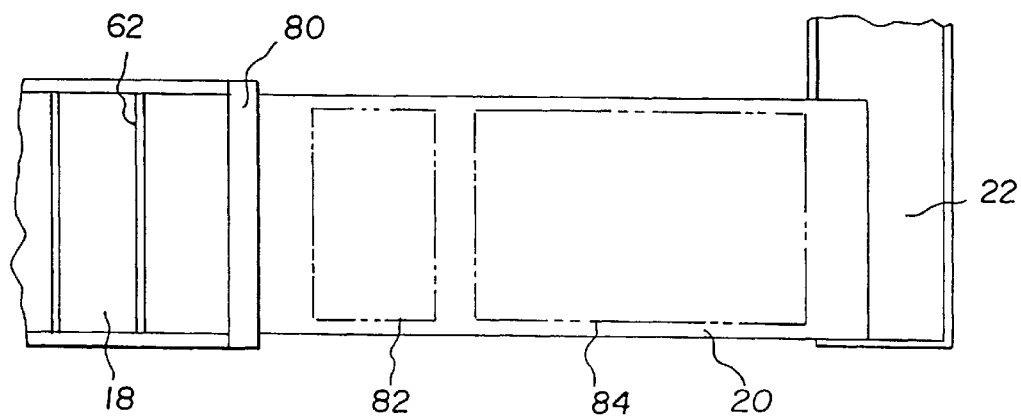
FIG. 7 is a top plan view of the continuous belt conveyor section of the apparatus of FIG. 1.

Looking next at FIG. 7, there is shown a top plan view of the belt conveyor section 20. Dotted line 82 represents the inspection field of view of the camera or other image capture means (not shown). Dotted line 84 represents the pick area from which the robot (not shown) picks parts 24 traveling on conveyor 20. The inspection camera (not shown) is preferably directed perpendicular to the belt conveyor 20. Examples of lighting and image capture systems which are particularly useful in combination with the present invention are disclosed in U.S. patent application Ser. No. 08/991,491 entitled, "Inspection Method and Apparatus for Determining the Side-up Orientation of an Object Resting on a Flat Surface" and U.S. patent application Ser. No. 08/991,728 entitled, "Method and Apparatus for Determining Orientation of Parts Resting on a Flat Surface" both filed on Dec. 16, 1997, which are hereby incorporated herein by reference. The combination of vibratory conveyor 18, transition plate 80 and belt conveyor 24 provide an advantage in delivering separated parts 24 to an inspection field of view 82 in stable orientations. This advantage is significantly enhanced with the incorporation of ribs 62 into the vibratory conveyor 18.

Parts 24 pass into the field of view 82 for inspection. Location information of all parts determined to be "pickable" is sent to the robot controller. The encoder allows for monitoring of all belt and part movement between the time of inspection and the time of grasping or picking. Parts 24 then pass into the pick area 84 where the robot grasps at least a portion of the parts 24 that have been inspected and determined to be "pickable". Any parts 24 which are not picked by the robot continue to move along belt conveyor 20 to fall into trough 22 and, as such, are returned to storage bin 12.

Using the vibratory conveyor 18 of the present invention in combination with belt conveyor 20 enables separated parts 24 to be delivered to the field of view 82 far in excess of the conveyors of the prior art. Separated parts 24 can be delivered to the field of view 82 at rates ranging up to 60 to 100 parts per minute, or even higher. The automated process (whether it be inspection, robotic assembly, and/or part classification, etc.) in which the conveying system is being used is no longer limited by the rate at which usable parts are presented. Rather, the overall process becomes limited by the speed of the downstream activities. Thus, for example, if the separated parts 24 are being acquired from the pick area 84 for assembly, the speed of the assembly process will be limited by the speed of the robot and not by the rate at which separated parts 24 pass into the pick area 84.

Due to the conveyance nature of the vibratory conveyor 18 and transition plate 80, the majority of parts 24 passing into the inspection area or field of view 82 possess orientations which are relatively stable thereby minimizing the number of likely orientations for each individual part 24. Minimizing the number of likely orientations increases the speed at which at which parts 24 can be inspected and/or identified for picking. If a less stable part orientation is desired for inspection and grasping by a robot, a change in elevation between transition plate 80 and belt conveyor 20 may be incorporated to intentionally and gently "tumble" parts 24 during transfer to belt conveyor 20.

Those skilled in the art will recognize that overall part separations on belt conveyor 20 may, to some extent, be further increased without adversely affecting the uniformity of part distribution by two means. First, although not preferred, electromagnetic actuator 72 may be quickly cycled on and off to thereby operate vibratory conveyor 18 intermittently. By controlling electromagnetic actuator 72 in such a manner, a reduction in the overall rate at which parts 24 are transferred to belt conveyor 20 is achieved, thus, further increasing overall part separation on belt conveyor 20. Alternatively, belt conveyor 20 can be driven at a higher constant speed. The higher speed of belt conveyor 20 will result in a greater separation of parts supported thereon as they are transferred from transition plate 80. As stated above, those skilled in the art will appreciate that increasing the speed of conveyor belt 20 may require strobe lighting to obtain the sharp image of parts 24 necessary for inspection and/or picking.

From the foregoing, it will be seen that this invention is one well adapted to attain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. An apparatus for uniformly distributing parts on a conveyor surface:

(a) a storage bin for holding randomly oriented parts in bulk;

(b) an elevating conveyor adjacent said storage bin, said elevating conveyor acquiring a fragment of the randomly oriented parts in said storage bin, said elevating conveyor elevating said fragment of randomly oriented parts and delivering said fragment of randomly oriented parts to a chute;

(c) a vibratory conveyor receiving said fragment of randomly oriented parts from said chute;

(d) a belt conveyor for receiving the randomly oriented parts from said vibratory conveyor, said belt conveyor including a camera field of view area and a robot pick area; and (e) a trough positioned adjacent a downstream end of said belt conveyor for receiving any of the randomly oriented parts not retrieved from said belt conveyor, said trough returning the randomly oriented parts received therein to said storage bin.

2. An apparatus as recited in claim 1 wherein:

said vibratory conveyor includes at least one rib projecting upward therefrom and extending across at least a section of said vibratory conveyor perpendicular to a direction of conveyance of said vibratory conveyor, said at least one rib acting as a flow obstruction to cause the randomly oriented parts traveling on said vibratory conveyor to gather and spread across a width of said vibratory conveyor, the randomly oriented parts being spread more uniformly on said vibratory conveyor after passing over said at least one rib.

3. An apparatus as recited in claim 1, said elevating conveyor comprising:

(a) a bulk elevator including a top surface, said bulk elevator reciprocating to a low point at which a portion of the randomly oriented parts in said storage bin move by gravity to reside on said top surface; and (b) a staging platform adjacent said bulk elevator, said bulk elevator reciprocating to a high point at which at least some of said portion of the randomly oriented parts transfer by gravity to said staging platform to thereby create a secondary reservoir of randomly oriented parts on said staging platform which is continually restocked by said bulk elevator.

4. An apparatus as recited in claim 3, said elevating conveyor further comprising:
a reciprocating plate conveyor adjacent said staging platform, said reciprocating plate conveyor acquiring a fragment of said secondary reservoir of the randomly oriented parts, said reciprocating plate conveyor delivering said fragment of randomly oriented parts to said chute.

5. An apparatus as recited in claim 2, said vibratory conveyor comprising:
(a) a support member with a generally planar top surface;
(b) means for vibrating said support member; and
(c) a vibratory surface material supported on said generally planar top surface, said at least one rib projecting upward through said vibratory surface material and extending across at least a section of said support member, said at least one rib being about perpendicular to a direction of conveyance of said vibratory conveyor, said at least one rib acting as a flow obstruction to cause the randomly oriented parts traveling on said vibratory surface material to gather and spread across a width of said planar member, the randomly oriented parts being spread more uniformly on said vibratory surface material after passing over said at least one rib.

6. A vibratory conveyor as recited in claim 5 further comprising:
a backer member affixed to an underside of said vibratory surface material.

7. A vibratory conveyor as recited in claim 6 further comprising:
a sheet material affixed to said support member.

8. A vibratory conveyor as recited in claim 7 wherein:
said backer member is magnetically coupled to said sheet material.

9. A vibratory conveyor as recited in claim 6 wherein:
said backer member is a magnetic material.

10. A vibratory conveyor as recited in claim 6 wherein:
said backer member is a magnetic vinyl.

11. A vibratory conveyor as recited in claim 7 wherein:
said sheet material is a magnetic material.

12. A vibratory conveyor as recited in claim 5 wherein:
said rib includes a front face which is oriented at an angle of from about 10° to about 30° from vertical.

13. A vibratory conveyor as recited in claim 7 wherein:
said sheet material is a magnetic vinyl.

14. A vibratory conveyor as recited in claim 5 wherein:
said vibratory surface material is a pile material which includes a surface of fibers, said fibers oriented in a range of from about 50° to about 80° from vertical.

15. A vibratory conveyor as recited in claim 6 wherein:
said rib is magnetically coupled to said backer member.

16. A vibratory conveyor as recited in claim 7 wherein:
said rib is magnetically coupled to said sheet material.

17. A vibratory conveyor as recited in claim 5 wherein:
there are at least two of said ribs and successive ones of said ribs decreasing in height in said direction of conveyance.

18. An apparatus as recited in claim 1, said vibratory conveyor comprising:
(a) a pile material; and
(b) a backer member affixed to an underside of said pile material.

19. An apparatus as recited in claim 18 further comprising:
a sheet material affixed to said backer member.

20. An apparatus as recited in claim 18 wherein:
said backer member is a magnetic material.

21. An apparatus as recited in claim 19 wherein:
said sheet material is a magnetic material.

22. An apparatus as recited in claim 18 wherein:
said pile material includes a surface of fibers, said fibers oriented in a range of from about 50° to about 80° from vertical.

23. An apparatus as recited in claim 18 further comprising:
at least one rib projecting upward through said pile material and extending across at least a section of said support member, said at least one rib being about perpendicular to a direction of conveyance of said vibratory conveyor, said at least one rib acting as a flow obstruction to cause the randomly oriented parts traveling on said pile material to gather and spread across a width of said vibratory conveyor, the randomly oriented parts being spread more uniformly on said pile material after passing over said at least one rib, said rib being magnetically coupled to said backer member.

24. An apparatus as recited in claim 19 further comprising:
at least one rib projecting upward through said pile material and extending across at least a section of said support member, said at least one rib being about perpendicular to a direction of conveyance of said vibratory conveyor, said at least one rib acting as a flow obstruction to cause the randomly oriented parts traveling on said pile material to gather and spread across a width of said vibratory conveyor, the randomly oriented parts being spread more uniformly on said pile material after passing over said at least one rib, said rib being magnetically coupled to said sheet material.

25. An apparatus as recited in claim 5 wherein:
there are at least two of said ribs and successive ones of said ribs decreasing in height in said direction of conveyance.

26. An apparatus as recited in claim 1 further comprising:
a short tansition plate between said vibratory conveyor and said belt conveyor over which the randomly oriented parts must pass to be transferred from said vibratory conveyor to said belt conveyor, said short transition plate not affecting part orientation or separation.

27. A vibratory conveyor as recited in claim 12 further comprising:
means for vibrating said support member at an angle of from about 10° to about 30° from vertical, said angle of vibration being generally parallel to said angle of said front face of said rib.

28. An apparatus as recited in claim 27 further comprising:
means for adjusting an amplitude of vibration of said vibratory conveyor.

29. An apparatus as recited in claim 26 wherein:
said belt conveyor is driven at a speed which is not less than an average speed of the randomly oriented parts on said vibratory conveyor.

30. An apparatus as recited in claim 29 wherein:
said short transition plate is inclined at an angle of not more than about 5° from horizontal.

* * * * *